United States Patent
Waldman

(10) Patent No.: US 6,917,619 B1
(45) Date of Patent: Jul. 12, 2005

(54) SYSTEM AND METHOD FOR INTERCONNECTING ATM SYSTEMS OVER AN INTERMEDIATE ATM NETWORK USING SWITCH VIRTUAL CONNECTIONS

(75) Inventor: Francis R. Waldman, Fair Haven, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/229,704

(22) Filed: Jan. 13, 1999

(51) Int. Cl.[7] .............................................. H04L 12/28
(52) U.S. Cl. .................................... 370/401; 370/395.1
(58) Field of Search .......................... 370/395.1, 395.3, 370/395.31, 401, 402, 403, 407, 409, 395.2, 395.5, 395.51

(56) References Cited

U.S. PATENT DOCUMENTS

| | | | | |
|---|---|---|---|---|
| 5,831,975 A | * | 11/1998 | Chen et al. ................. | 370/256 |
| 5,933,412 A | * | 8/1999 | Choudhury et al. ........ | 370/218 |
| 6,141,339 A | * | 10/2000 | Kaplan et al. ............... | 370/352 |
| 6,208,623 B1 | * | 3/2001 | Rochberger et al. ........ | 370/254 |
| 6,272,139 B1 | * | 8/2001 | Soncodi ...................... | 370/397 |
| 6,483,912 B1 | * | 11/2002 | Kalmanek et al. .......... | 379/219 |
| 6,501,755 B1 | * | 12/2002 | McAllister et al. ......... | 370/392 |

* cited by examiner

Primary Examiner—Duc Ho
Assistant Examiner—Thien D Tran
(74) Attorney, Agent, or Firm—Ryan, Mason & Lewis, LLP

(57) ABSTRACT

A system for interconnecting ATM systems over an ATM facility using switch virtual connections, without having to reprogram existing addresses of the ATM systems when using a switching ATM service network. The system includes two or more ATM systems having an ATM system addressing scheme and an intermediate switching ATM network having an intermediate switching ATM network addressing scheme, which is independent of and unknown to the ATM systems. Calls are transmitted between hosts of different ATM systems via border node switches. The hosts are unaware of the intermediate switching ATM network addressing scheme and thus only identify the ATM system address of the called party host in a called party address information element. The border nodes serve as an interface between the two addressing schemes. A calling party border node substitutes in a called party address information element an intermediate switching ATM network address of a called party border node for the called party ATM system address to route the call over the intermediate switching ATM network. After routing the call over the intermediate switching ATM network the called border node generates in the called party address information element the ATM system address of the called party host. The ATM systems are therefore interconnected over an intermediate ATM network without incurring the time and expense to reprogram the ATM system addressing schemes.

14 Claims, 3 Drawing Sheets

SYSTEM AND METHOD FOR INTERCONNECTING ATM SYSTEMS OVER AN INTERMEDIATE ATM NETWORK USING SWITCH VIRTUAL CONNECTIONS

FIELD OF THE INVENTION

The present invention relates to a system for interconnecting asynchronous transfer mode systems over an intermediate asynchronous transfer mode network using switch virtual connections, and a method of using the same.

BACKGROUND OF THE INVENTION

Asynchronous transfer mode (ATM) services are typically permanent virtual connection (PVC) based, however, some carriers offer switch virtual connection (SVC) services. In the future it is expected that SVCs will become widely used to provide backup, additional bandwidth on demand, communication with smaller systems, and interoffice communications.

Users of ATM local area network (LAN)/wide area network (WAN) configurations, such as LAN emulation (LANE), multi-protocol over ATM (MPOA), or proprietary, interconnect geographically dispersed systems over private lines or public ATM service permanent virtual path (PVP) connections with SVC tunneling. Routing is accomplished using static routing protocols or dynamic routing protocols, such as Private Network-Node-Interface (PNNI). Addressing in an ATM network is difficult to manage because the size of each address is 40 characters. Consequently, once the internal ATM addresses of each LAN are established, it is relatively expensive to modify the addressing scheme. If switching to SVC service becomes desirable, then the service provider must assign its own unique ATM addresses so that voice and data may be routed over the public domain based on those addresses. The time required to change existing addresses when switching to SVC service is so significant as to be impractical and cost prohibitive.

It is therefore desirable to incorporate SVC based ATM LAN/WAN configurations in a private line or public network SVC environment without the need for readdressing of the ATM network when using a switching ATM service network.

SUMMARY OF THE INVENTION

In a preferred embodiment, the method in accordance with the present invention interconnects a calling party asynchronous transfer mode system and a called party asynchronous transfer mode system using an intermediate switching asynchronous transfer mode network. Each asynchronous transfer mode system has an associated border node, such as an ATM switch. The system routes calls over the intermediate switching asynchronous transfer mode network based on an intermediate switching ATM network addressing scheme that is recognized by the border nodes and independent of an addressing scheme of the asynchronous transfer mode systems. Specifically, the border node of the calling party asynchronous transfer mode system generates an intermediate switching asynchronous transfer mode network address of the border node of the called party asynchronous transfer mode system. Calls are routed over the intermediate switching asynchronous transfer mode network from the border node of the calling party asynchronous transfer mode system to the border node of the called party asynchronous transfer mode system based on the intermediate switching asynchronous transfer mode network addressing scheme.

In a preferred embodiment, the method described above is performed using a system including an intermediate switching asynchronous transfer mode network having an asynchronous transfer mode addressing scheme, which is connected to a calling party border node and a called party border node. A calling party asynchronous transfer mode system and a called party asynchronous transfer mode system are connected to the calling party border node and called party border node, respectively. The asynchronous transfer mode systems have an asynchronous transfer mode system addressing scheme independent from the addressing scheme of the intermediate switching asynchronous transfer mode network. The border nodes serve as an interface between the addressing scheme of the asynchronous transfer mode systems and the intermediate switching asynchronous transfer mode network addressing scheme.

BRIEF DESCRIPTION OF THE DRAWINGS

The foregoing and other features of the present invention will be more readily apparent from the following detailed description and the drawings of illustrative embodiments of the invention wherein like reference numbers refer to similar elements throughout the several views and in which.

DETAILED DESCRIPTION OF THE INVENTION

For the purposes of this invention, the term "system" is defined as a network including a host having an asynchronous transfer mode network interface card (ATM NIC), a switch, a bridge, a router, and/or some other device with ATM capabilities. The ATM switching network in accordance with the present invention is used to establish dynamic connections between ATM systems, based on an ATM system addressing scheme recognized by the ATM systems, over an intermediate switching ATM network with its own addressing scheme which is unknown to the ATM systems.

Figure 1:
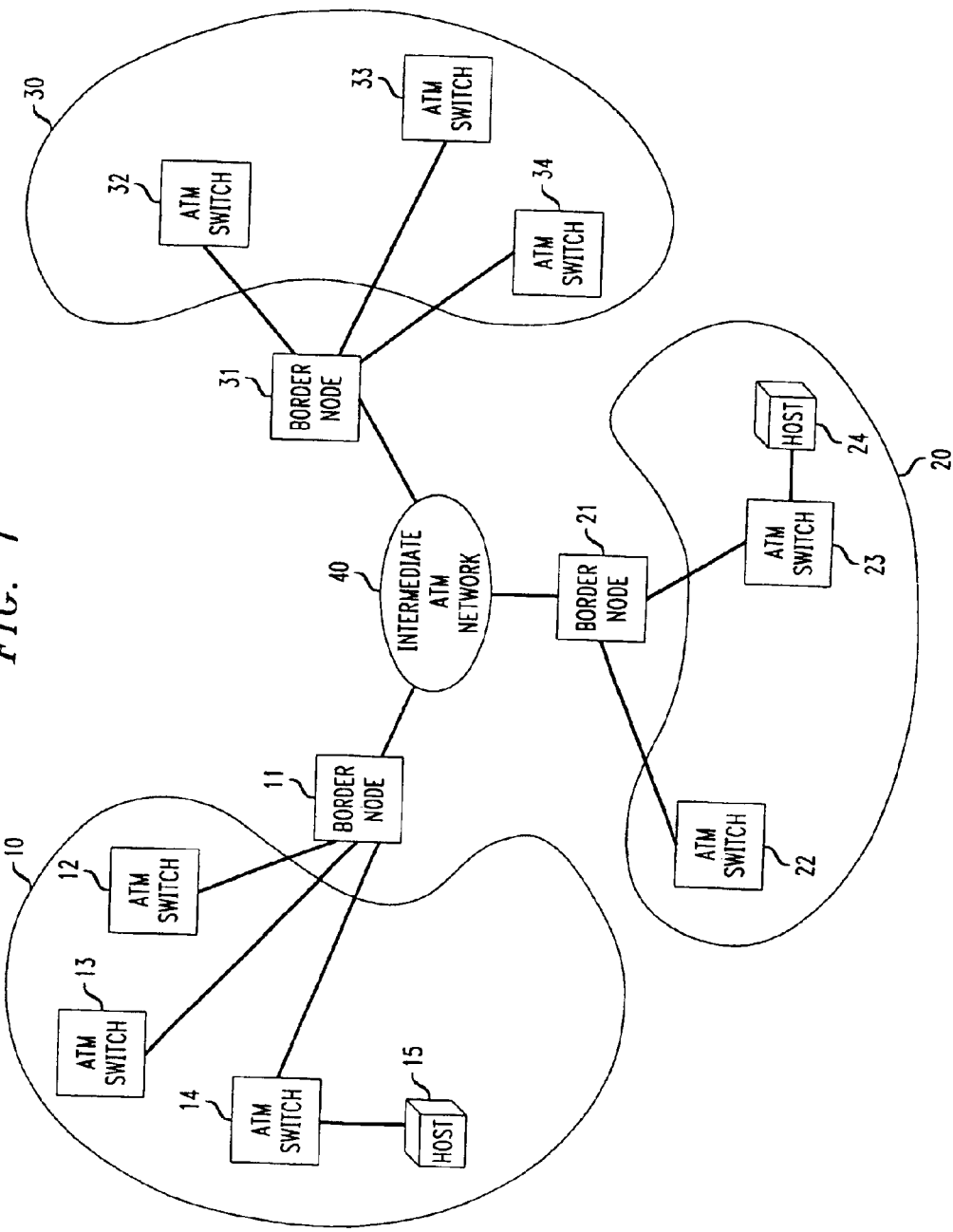
FIG. 1 is an example of the ATM switching network in accordance with the present invention.

By way of example, FIG. 1 shows an ATM switching network in accordance with the present invention with three local ATM systems 10, 20, 30. It is, however, to be understood that the ATM switching network may be used with two or more ATM systems. Each ATM system has at least one border node (BN), such as an ATM switch. The BN serves as an interface between an intermediate switching ATM network 40 and each of the local ATM systems. In this regard, the BN recognizes addressing scheme information for both the intermediate switching ATM network and the local ATM systems. In FIG. 1, ATM systems 10, 20, 30, have a single border node 11, 21, 31, respectively. In addition, the ATM systems may have a host. For example, ATM systems 10, 20 have hosts 15, 24, respectively. Alternatively, each ATM system may have more than one host, or no host at all (as shown in ATM system 30). Furthermore, each ATM system may have one or more non-border nodes (NBNs) connected between the host and the BN, for example, in ATM system 10, host 15 is connected to BN 11 via NBN switch 14. Otherwise, the host may be directly connected to the BN without any NBNs.

ATM systems 10, 20, 30 are connected to an intermediate switching ATM network 40, such as a public switching network, via BNs 11, 21, 31, respectively. The interfaces and hosts in each ATM system have assigned internal addresses using conventional formats, such as data country code (DCC), international code designator (ICD), or E-164, that differ from the intermediate switching ATM network addresses. The BN determines using a dynamic routing protocol, such as PNNI, or static routing tables, whether the call should be routed over the intermediate network address and converts the internal ATM system address to an intermediate network address. An asynchronous transfer mode user network interface (ATM UNI) signaling protocol, for example, as described in the ATM Forum ATM User-Network Interface Specification Versions 3.1 (September 1994) and 4.0 (May 1996), is used to communicate between a host and a NBN or BN switch. The ATM UNI signaling protocol establishes communication between systems via a SETUP message including a called party address information element. The SETUP message may optionally also include a calling party address information element, a calling party subaddress information element, and a called party subaddress information element. For instance, it may be desirable to include a calling party address information element and calling party subaddress information element to verify the calling party in order to stop hackers from entering the system.

The hosts in the ATM systems are unaware of the independent addressing scheme of the intermediate switching ATM network and, thus the SETUP messages transmitted between the host and the NBN or BN only specify the local ATM system addresses in the called party address information element, without specifying the called party subaddress information element. Each NBN switch in the network determines its route and the-designated transition list (DTL) by conventional methods known in the art.

The present invention is described in general terms for transmitting over the intermediate switching ATM network from a calling party ATM system to a called party ATM system. In a preferred embodiment, the calling party host generates a SETUP message including a called party address information element and a calling party address information element to prevent hackers from entering the system by verifying that the calling party host, identified by its calling party address information element, is authorized to enter the system. In the situation where the calling party host is connected to a calling party BN via one or more NBN switches, then the NBN switches receive the SETUP message from the calling party host with the internal ATM system address of the called party host provided in the called party address information element. In return, the NBN switches in the SETUP message populate in the called party subaddress information element the same information provided in the called party address information element and populate the calling party address in the calling party subaddress information element. In a preferred embodiment the information in the called party subaddress information element is encrypted for additional security. If the calling party BN determines that the call should be routed over the intermediate switching ATM network, then it substitutes in the called party address information element the intermediate switching ATM network address of the called party BN for the ATM system address of the called party host, while the called party subaddress information element remains unchanged. In addition, the calling party BN substitutes its own intermediate switching ATM network address for the ATM system address of the calling party host in the calling party address information element, and leaves unchanged the calling party subaddress information element. The call is then routed over the intermediate switching ATM network from the calling party BN to the called party BN based on the intermediate switching ATM network address of the called party BN in the called party address information element. Upon receiving a call the called party BN substitutes in the called party address information element, the decrypted (if encrypted) ATM system address of the called party host from the called party subaddress information element for the intermediate switching ATM network address of the called party BN, and routes the call accordingly. The called party BN also substitutes in the calling party address information element the ATM system address of the calling party host from the calling party subaddress information element for the intermediate switching ATM network address of the calling party BN.

In the situation in which the host is directly connected to the BN, then the BN performs the function of the NBN in addition to the functions typically performed by the BN as described above. Specifically, the operation of populating in the called party subaddress information element the same information provided in the called party address information element is performed by the BN, instead of the NBN.

If the received call at the called party BN has an unknown or no called party subaddress information element then the called party BN can not route the call to a called party host. In this situation, if the ATM adaptation layer (AAL) parameter of the SETUP message is AAL5, signifying transmission control protocol/internet protocol (TCP/IP), then by default, the called party BN may be programmed to assume that the call is from an ATM party authorized to connect to the network but having no knowledge of the internal ATM addresses and, automatically connect the call to a designated remote access server (RAS). This embodiment assumes that the third party-knows the Internet protocol (IP) address of the RAS. In an alternative embodiment, the called party BN may be programmed to clear the incoming call when no or an unknown called party subaddress information element has been provided, thereby preventing hackers from entering the ATM network.

Although in the previously described preferred embodiment the calling party host generates a SETUP message including a called party address information element and a calling party address information element, it is within the intended scope of the invention for the calling party host to generate a SETUP message specifying only the called party address information element, and not include calling party address and subaddress information elements. In, this alternate embodiment, since no calling party information elements are specified the operations concerning these information elements are not performed.

Figure 3:
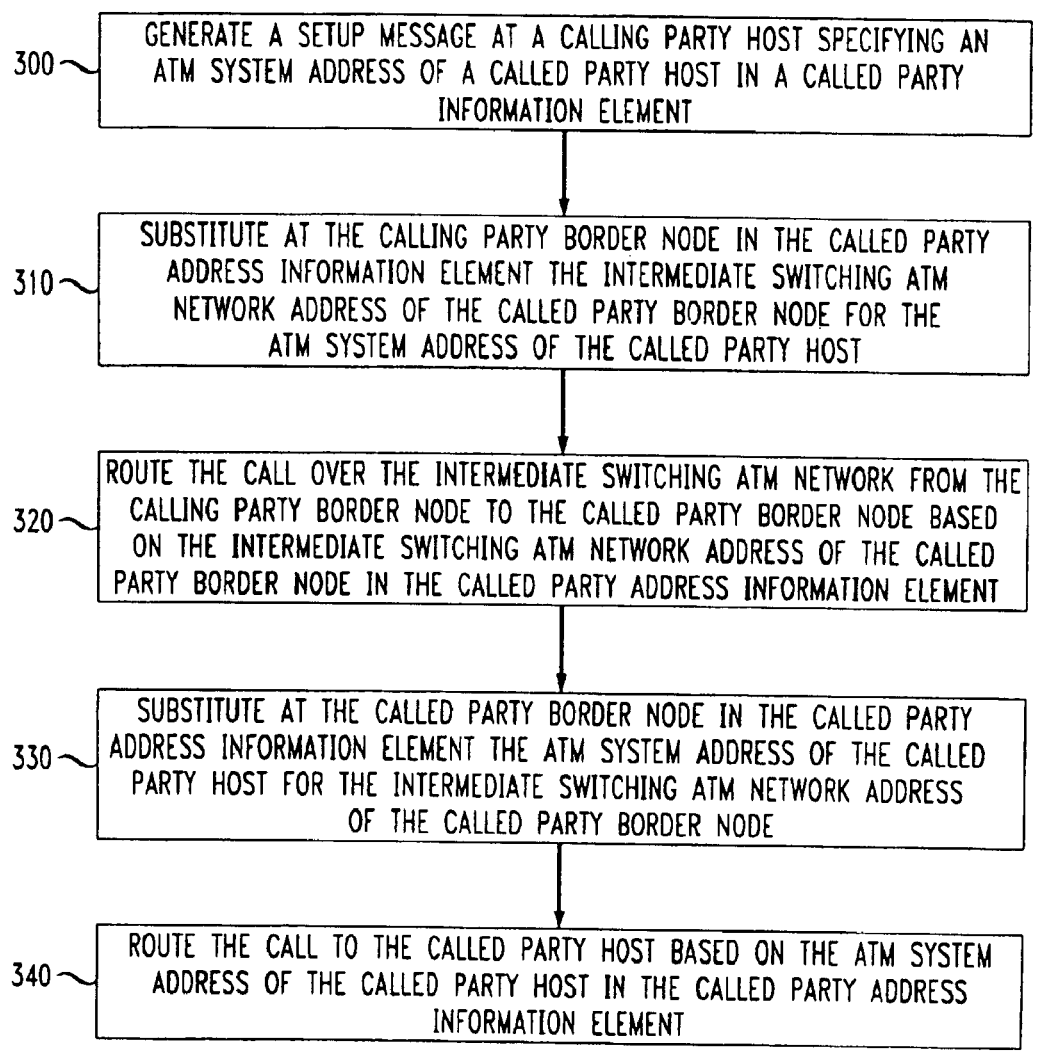
FIG. 3 is a flow chart of an ATM switching method in accordance with the present invention.

FIG. 3 is a flow chart of the broad ATM switching scheme in accordance with the present invention, irrespective of whether the system includes NBNs or whether the SETUP message specifies a calling party address information element. Initially, in step 300 the calling party host generates a SETUP message specifying an ATM system address of a called party host in a called party information element. In step 310 at the calling party border node in the called party address information element the intermediate switching ATM network address of the called party BN is substituted for the ATM system address of the called party host. The call is then routed, in step 320, over the intermediate switching ATM network based on the called party address information element. Once the call is transmitted over the intermediate network, the called party BN substitutes in the called party address information element the ATM system address of the called party host for the intermediate switching ATM network address of the called party BN. Then, in step 340, the call is routed to the called party host based on the called party address information element.

In summary, the hosts recognize only the local ATM addresses and are unaware of the intermediate switching ATM network addressing scheme. The BNs serve as an interface between the ATM systems and intermediate switching ATM network. In particular, calling party BNs introduce the addressing scheme recognized by and unique to the intermediate switching ATM network in the called party address information element while routing the call between local ATM systems, whereas called party BNs identify the called party address from the information provided in the called party subaddress information element.

The operation of the switching system in accordance with the present invention for a calling party host that generates a SETUP message specifying only a called party address information element (without specify a calling party address information element) will now be described for the example network shown in FIG. 1. If a calling party host 15 that belongs to calling party ATM system 10 wishes to communicate with a called party host 24 belonging to called party ATM system 20, then a connection is established over switch 14, calling party BN 11, called party BN 21, and NBN switch 23. By way of example, the addresses of the calling party host, calling party BN, called party BN, and called party host are ATMA.1, ATMPUBA.1, ATMPUBB.1, ATMB.1, respectively, wherein ATMA.1 and ATMB.1 are local ATM system addresses, and ATMPUBA.1 and ATMPUBB.1 are intermediate switching ATM network addresses, not recognized by the ATM systems. Calling party host 15 identifies the local ATM system address (ATMB.1) of the called party host 24, such as by provisioning, LANE, MPOA, proprietary, or other known techniques. The calling party host 15 transmits a SETUP message to switch 14, and specifies in the called party address information element the internal ATM system address (ATMB.1) of the called party host 24. The NBN 14 determines using conventional routing techniques, such as routing tables, that the call is to be handled by the calling party BN 11, and transmits a SETUP message to the calling party BN 11, specifying the internal ATM system address of the called party host 24 (ATMB.1) in the called party address information element and in the called party subaddress information element. In return, the calling party BN 11 establishes that the call is to be routed to the called party BN 21 over the intermediate ATM network 40 using conventional routing techniques.

After determining the called party BN 21 to route the call, the calling party BN 11 substitutes in the called party address information element the internal ATM system address (ATMPUB.1) of the called party BN 21 for the internal ATM system address (ATMB.1) of the called party host, while leaving unchanged the ATM address (ATMB.1) of the called party host 24 in the called party subaddress information element. Upon receiving the SETUP message from the intermediate switching ATM network, the called party BN 21 determines, for example, using routing tables, that the call is to be transmitted to the called party host 24 via NBN 23, based on the called party subaddress information element. The called party BN 21 then transmits a SETUP message to NBN 23 specifying the ATM address of the called party host 24 (ATMB.1) in the called party address information element and the called party subaddress information element. Upon receiving the call, NBN 23 determines what interface the called party host 24 is connected to and transmits an appropriate SETUP message to the called party host 24 specifying the internal ATM system address of the called party host (ATMB.1) in the called party address information element, without specifying the called party subaddress information element.

Figure 2:
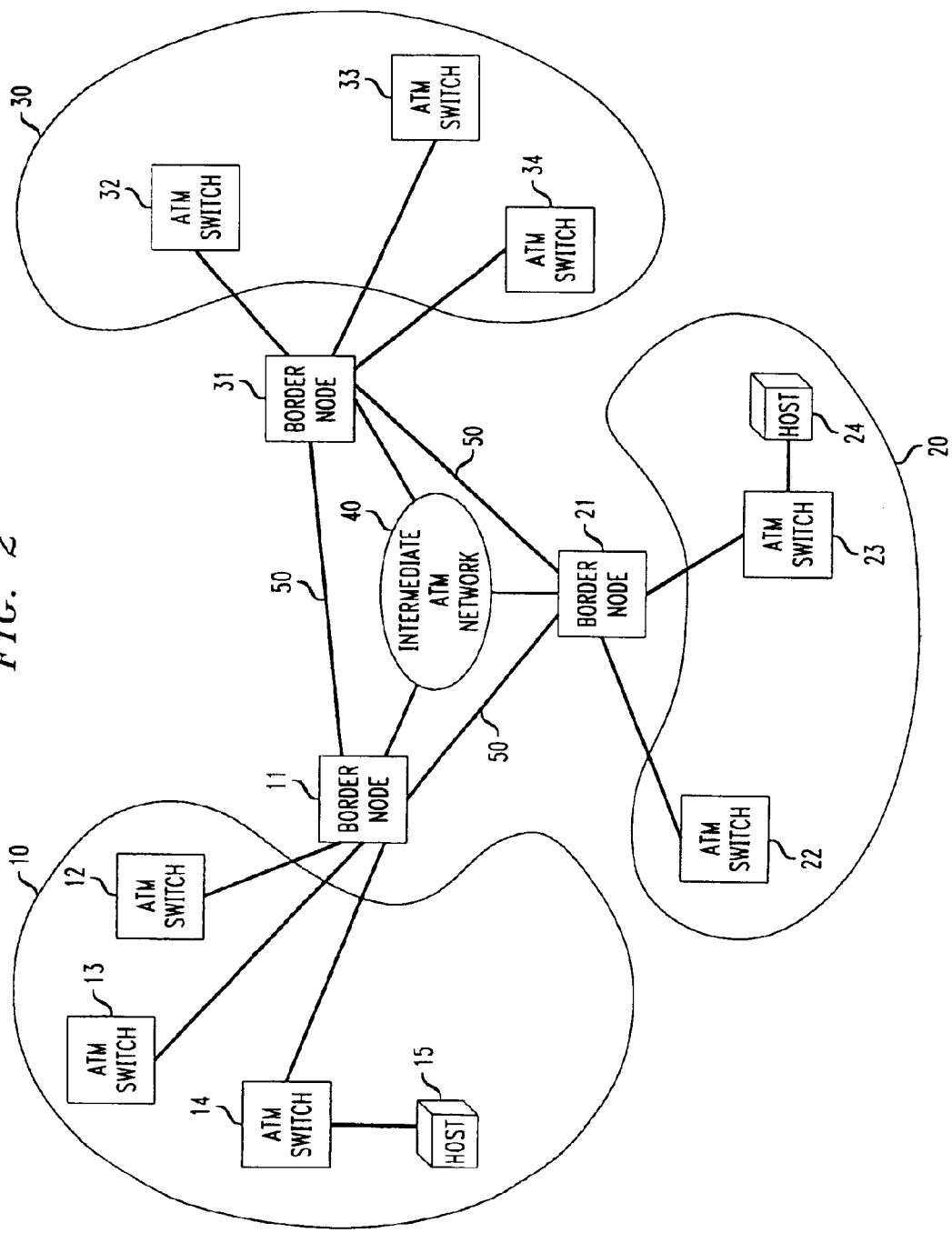
FIG. 2 is another example of the ATM switching network in accordance with the present invention.

FIG. 2 is another configuration of the switching network in accordance with the present invention. This arrangement differs from that shown and described for FIG. 1 in that each ATM system is connected by a private line (PL) 50, in addition to being interconnected via an intermediate ATM network. Under normal circumstances, calls are transmitted via the PLs 50. The addressing scheme of the PLs 50 use only internal addresses, no intermediate network ATM address substitution at the border nodes is required. If, however, the calling BN determines that a call should be routed over the intermediate switching ATM network, for example, due to insufficient bandwidth and/or failure of a PL, the method described above for routing the call via the intermediate ATM network and substituting the address of the intermediate network is performed.

The ATM switching network in accordance with the present invention has many applications including: SVC backup for private line connections; increased bandwidth on demand, remote access to corporate networks via ATM switching services, relatively small system connectivity to a corporate network via ATM switching services, and connectivity among ATM systems.

Thus, while there have been shown, described, and pointed out fundamental novel features of the invention as applied to a preferred embodiment thereof, it will be understood that various omissions, substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for interconnecting a calling party asynchronous transfer mode system having a calling party host and a called party asynchronous transfer mode system having a called party host using an intermediate switching asynchronous transfer mode network and a border node associated with each asynchronous transfer mode system comprising:

routing a call from said calling party host to said called party host over the intermediate switching asynchronous transfer mode network based on an intermediate switching ATM network addressing scheme that is recognized by said border nodes and independent of an addressing scheme of said asynchronous transfer mode systems;

wherein said routing step comprises:

substituting at the border node of the calling party asynchronous transfer mode system in a called party address information element an intermediate switching asynchronous transfer mode network address of the border node of the called party asynchronous transfer mode system for the asynchronous transfer mode system address of the called party host; and routing the call over the intermediate switching asynchronous transfer mode network from the border node of the calling party asynchronous transfer mode system to the border node of the called party asynchronous transfer mode system based on the intermediate switching asynchronous transfer mode network address in the called party address information element.

2. A method for interconnecting a calling party asynchronous transfer mode system to a called party asynchronous transfer mode system by way of a calling party border node, an intermediate switching asynchronous transfer mode network having an intermediate asynchronous transfer mode network addressing scheme, and a called party border node, the calling party asynchronous transfer mode system having a calling party host connected to the calling party border node by at least one calling party non-border node, the called party asynchronous transfer mode system having a called party host connected to the called party border node by at least one called party non-border node, the calling and called party hosts having an asynchronous transfer mode system addressing scheme independent of the intermediate switching asynchronous transfer mode network addressing scheme, comprising:

generating at the calling party host a SETUP message specifying the asynchronous transfer mode system address of the called party host in a called party address information element;

routing the call to the at least one calling party non-border node based on the called party address information element;

generating at the at least one calling party non-border node a SETUP message specifying in a called party subaddress information element the asynchronous transfer mode system address of the called party host from the called party address information element;

routing the call to the calling party border node;

substituting at the calling party border node in the called party address information element the intermediate switching asynchronous transfer mode network address of the called party border node for the asynchronous transfer mode system address of the called party host;

transmitting the call over the intermediate switching asynchronous transfer mode network to the called party border node based on the intermediate switching asynchronous transfer mode network address of the called party border node in the called party address information element;

generating at the called party border node a SETUP message specifying in the called party address information element the asynchronous transfer mode system address of the called party host from the called party subaddress information element;

routing to the at least one called party non-border node the call based on the asynchronous transfer mode system address of the called party host in the called party address information element;

generating at the at least one called party non-border node a SETUP message specifying in the called party address information element the asynchronous transfer mode system address of the called party host, without identifying the called party subaddress information element; and routing the call to the called party host based on the asynchronous transfer mode system address of the called party host in the called party address information element.

3. A method in accordance with claim 2, wherein the called party subaddress is encrypted.

4. A method in accordance with claim 2, wherein said step of generating at the calling party host the SETUP message further comprises identifying the asynchronous transfer mode system address of the called party host using one of provisioning, local area network emulation, multi-protocol over asynchronous transfer mode, and proprietary techniques.

5. A method for interconnecting a calling party asynchronous transfer mode system to a called party asynchronous transfer mode system by way of a calling party border node, an intermediate switching asynchronous transfer mode network having an intermediate asynchronous transfer mode network addressing scheme, and a called party border node, the calling party asynchronous transfer mode system having a calling party host directly connected to the calling party border node, the called party asynchronous transfer mode system having a called party host directly connected to the called party border node, the calling and called party hosts having an asynchronous transfer mode system addressing scheme independent of the intermediate switching asynchronous transfer mode network addressing scheme, comprising:

generating at the calling party host a SETUP message specifying the asynchronous transfer mode system address of the called party host in a called party address information element;

generating at the calling party border node a SETUP message specifying in a called party subaddress information element the asynchronous transfer mode system address of the called party host in the called party address information element;

substituting at the calling party border node in the called party address information element the intermediate switching asynchronous transfer mode network address of the called party border node for the asynchronous transfer mode system address of the called party host;

transmitting the call over the intermediate switching asynchronous transfer mode network to the called party border node based on the intermediate switching asynchronous transfer mode network address of the called party border node in the called party address information element;

generating at the called party border node a SETUP message specifying in the called party address information element the asynchronous transfer mode system address of the called party host from the called party subaddress information element;

routing the call to the called party border node based on the asynchronous transfer mode system address of the called party host in the called party address information element;

generating at the called party border node a SETUP message specifying in the called party address information element the asynchronous transfer mode system address of the called party host, without identifying the called party subaddress information element; and routing the call to the called party host based on the asynchronous transfer mode system address of the called party host in the called party address information element.

6. A method in accordance with claimed 5, wherein the called party subaddress is encrypted.

7. A method in accordance with claim 5, wherein said step of generating at the calling party host the SETUP message further comprises identifying the asynchronous transfer mode system address of the called party host using one of provisioning, local area network emulation, multi-protocol over asynchronous transfer mode, and proprietary techniques.

8. A system for interconnecting asynchronous transfer mode systems comprising:

an intermediate switching asynchronous transfer mode network having an asynchronous transfer mode addressing scheme;

a calling party border node connected to said intermediate switching asynchronous transfer mode network;

a called party border node connected to said intermediate switching asynchronous transfer mode network;

a calling party asynchronous transfer mode system connected to said calling party border node; and a called party asynchronous transfer mode system connected to said called party border node;

said asynchronous transfer mode systems having an addressing scheme independent from the addressing scheme of said intermediate switching asynchronous transfer mode network, and said border nodes interfacing between the addressing scheme of said asynchronous transfer mode systems and the intermediate switching asynchronous transfer mode network addressing scheme;

wherein a call is routed from a calling party host to a called party host over the intermediate switching asynchronous transfer mode network by (i) substituting at the border node of the calling party asynchronous transfer mode system in a called party address information element an intermediate switching asynchronous transfer mode network address of the border node of the called party asynchronous transfer mode system for the asynchronous transfer mode system address of the called party host; and (ii) routing the call over the intermediate switching asynchronous transfer mode network from the border node of the calling party asynchronous transfer mode system to the border node of the called party asynchronous transfer mode system based on the intermediate switching asynchronous transfer mode network address in the called party address information element.

9. A system in accordance with claim 8, wherein said border nodes are asynchronous transfer mode switches.

10. A system in accordance with claim 8, wherein said calling party asynchronous transfer mode system comprises a calling party host directly connected to said calling party border node.

11. A system in accordance with claim 8, wherein said calling party asynchronous transfer mode system comprises:

a calling party host; and at least one calling party non-border node connected between said calling party host and said calling party border node.

12. A system in accordance with claim 8, wherein said called party asynchronous transfer mode system comprises a called party host directly connected to said called party border node.

13. A system in accordance with claim 8, wherein said called party asynchronous transfer mode system comprises:

a called party host; and at least one called party non-border node connected between said called party host and said called party border node.

14. A method for interconnecting a calling party asynchronous transfer mode system to a called party asynchronous transfer mode system by way of a calling party border node, an intermediate switching asynchronous transfer mode network having an intermediate asynchronous transfer mode network addressing scheme, and a called party border node, the calling party asynchronous transfer mode system having a calling party host connected to the calling party border node, the called party asynchronous transfer mode system having a called party host connected to the called party border node, the calling and called party hosts having an asynchronous transfer mode system addressing scheme independent of the intermediate switching asynchronous transfer mode network addressing scheme, comprising:

generating at the calling party host a message specifying the asynchronous transfer mode system address of the called party host in a called party address information element;

routing the call to the calling party border node;

substituting at the calling party border node in the called party address information element the intermediate switching asynchronous transfer mode network address of the called party border node for the asynchronous transfer mode system address of the called party host;

transmitting the call over the intermediate switching asynchronous transfer mode network to the called party border node based on the intermediate switching asynchronous transfer mode network address of the called party border node in the called party address information element;

generating at the called party border node a message specifying in the called party address information element the synchronous transfer mode system address of the called party host; and routing the call to the called party host based on the asynchronous transfer mode system address of the called party host in the called party address information element.

* * * * *